United States Patent
Kherani et al.

[11] Patent Number: 5,942,757
[45] Date of Patent: Aug. 24, 1999

[54] MONITOR FOR MEASURING THE RADIOACTIVITY OF A SURFACE

[76] Inventors: Nazir P. Kherani, 563 The Kingsway, Etobicoke, Canada, M9A 3W9; Walter T. Shmayda, Box 17, King City, Canada, L0G 1K0

[21] Appl. No.: 08/861,223

[22] Filed: May 21, 1997

Related U.S. Application Data

[63] Continuation of application No. 08/452,250, May 26, 1995, abandoned.

[51] Int. Cl.[6] .................................................. G01T 1/185
[52] U.S. Cl. .......................................... 250/374; 250/375
[58] Field of Search ................................ 250/374, 385.1, 250/389, 375, 388

[56] References Cited

U.S. PATENT DOCUMENTS

| | | |
|---|---|---|
| 4,191,920 | 3/1980 | Guttenplan et al. . |
| 4,441,024 | 4/1984 | Anderson ................................. 250/380 |
| 5,032,729 | 7/1991 | Charpak ................................... 250/374 |
| 5,083,027 | 1/1992 | Kuhn ........................................ 250/374 |
| 5,087,820 | 2/1992 | Kearns .................................. 250/385.1 |
| 5,311,025 | 5/1994 | MacArthur et al. ..................... 250/374 |
| 5,384,462 | 1/1995 | Levitt ....................................... 250/374 |
| 5,525,804 | 6/1996 | MacArthur et al. ..................... 250/374 |

OTHER PUBLICATIONS

M.J. Wood et al., "Tritium Sampling and Measurement", *Health Physics,* Dec. 1993, pp. 619–621.
D.W. Colvin, "A Simple Monitor for Tritium Contamination on Surfaces", Oct. 1957, AEC Research & Dev. Rpt. DP–242.
Takahiro Aoyama and Tamaki Watanabe, "A New Type of $^3$H Surfaces–Contamination Monitor", *Health Physics,* vol. 48, Nov. 16, 1984.
Roland A. Finston, "Experience With a Novel, Radioactive–Contamination Meter Used for Biomedical Laboratory Surveys", CRSO Proceedings.
G.D. Whitlock, "Wiping Out Doubt", Laboratory Practice, vol. 40, No. 11.

*Primary Examiner*—Edward J. Glick
*Attorney, Agent, or Firm*—Bereskin & Parr

[57] ABSTRACT

A monitor for measuring the activity of a surface contaminated with a radioactive material, such as tritium, is disclosed. The monitor comprises: (a) a collector spaced from the surface; (b) a potential generators for generating a potential difference between the surface and the collector sufficient to induce particle migration; and (c) an electrometer or other current measuring device for measuring the current generated by impingement of charged particles on the collector.

20 Claims, 3 Drawing Sheets

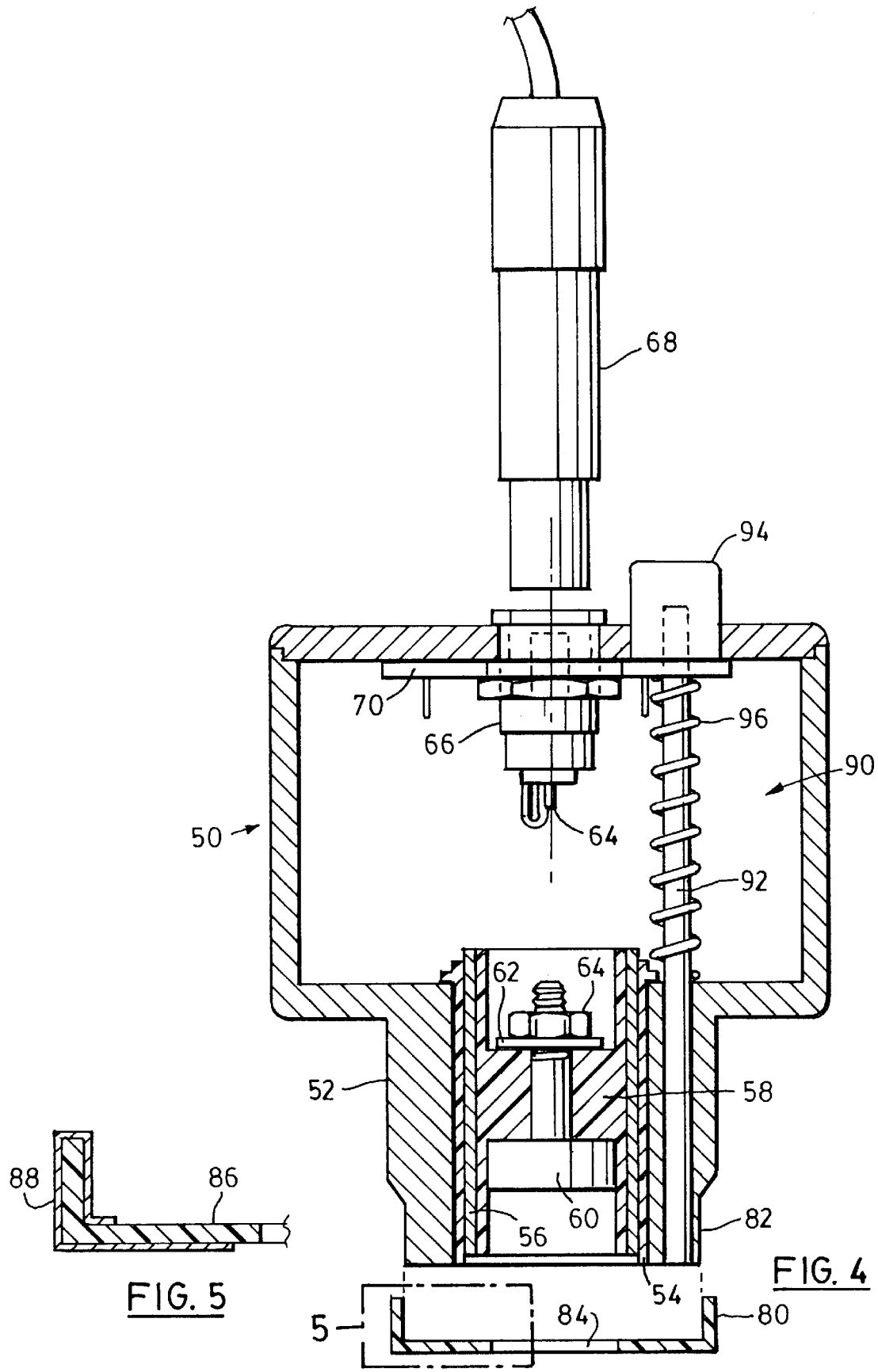

MONITOR FOR MEASURING THE RADIOACTIVITY OF A SURFACE

This application is a continuation of U.S. application Ser. No. 08/452,250 filed May 26, 1995, now abandoned.

FIELD OF THE INVENTION

The present invention relates to a monitor for measuring the radioactivity of a surface contaminated material, and in particular relates to a monitor for measuring the contamination of a surface by tritium.

BACKGROUND OF THE INVENTION

Because of the low energy levels of decay particles emitted from tritium when compared to those emitted from other radioisotopes, standard radioactivity detection techniques, such as Geiger counters, are generally inadequate determining the presence and concentration of tritium on a surface. Because of this, a variety of techniques and devices have been developed for the detection of tritium on surfaces.

The most commonly used method for the measurement of removable tritium surface contamination is wipe testing, which is also known as smearing. In this method, a standard filter disc-type wipe, made of polystyrene or paper, is rubbed over a known surface area (typically 100 cm$^2$) of the surface to be monitored. The wipe is then analyzed for tritium, usually with liquid scintillation counting or a windowless proportional counter. While this technique is relatively simple to perform, it does have significant drawbacks. Foremost, this technique only measures a fraction of the removable surface contamination. Also, the measured concentration of tritium can vary significantly due to the vagaries associated with wiping of surfaces, such as the type of wipe media, the nature of the surface and the manner in which the wiping is performed. Further, this technique does not afford real time monitoring of tritium contamination, tends to alter the surface and labour intensive to perform.

Windowless plastic scintillators have also been used to measure tritium contamination of surfaces. These devices comprise a flat plastic scintillator which is viewed by two photomultipliers detecting coincident-light photons. With these scintillators, it is necessary to achieve a seal between the scintillator and the surface that is capable of both excluding external light and sustaining a partial vacuum. As such a seal can be difficult to achieve in field usage, these devices have, for practical purposes, generally been limited to laboratory use.

Windowless proportional gas flow counters have also been used to detect tritium surface contamination. These devices contain a multiwire proportional counter with mesh cathodes and require a high potential and the supply of a counting gas. Because of the need to supply a counting gas, and of the fragility of the collecting wires, the use of these devices has been limited.

SUMMARY OF THE INVENTION

It is an object of the present invention to provide a monitor for measuring tritium surface contamination, which is easy to use and directly measures the tritium surface contamination. It is a further object of the present invention to provide such a monitor that is capable of providing real time detection. It is a further object to provide a monitor which is small in size and readily portable.

These and other objects of the present invention are realized by providing a monitor for measuring the radioactivity of a contaminated surface, which is integral and capable of being smeared, from which surface a flux of decay particles is emitted and which surface is separate from and does not form part of the monitor, to enable the monitor to be applied to a succession of different surfaces, the monitor comprising:

(a) an outer casing adapted to form a ground connection with the contaminated surface and extending to a contact plane where the outer casing contacts the contaminated surface;

(b) a collector disposed within the casing and spaced approximately 6 millimeters from the contact plane, so as in use to be spaced from the contaminated surface;

(c) generating means for generating a potential difference between the surface and the collector, the potential being of sufficient intensity to induce particle migration;

(d) connection means for forming a ground connection to the surface;

(e) a circuit connecting the generating means to the connection means and the collector; and (f) means, provided in the circuit, for measuring the current resulting from impingement of charged particles on the collector.

Another aspect of the present invention provides a method of measuring the radioactivity of a contaminated surface which is integral and capable of being smeared and from which a flux of beta decay particles Is emitted, the method comprising:

(a) bringing a collector to a position uniformly spaced from the surface;

(b) providing a molecular gas between the collector and the surface, in which molecular gas charged particles are created by passage of beta decay particles from the surface;

(c) providing a ground connection the surface;

(d) generating a potential difference between the surface and the collector, the potential being such as to create a potential gradient sufficient to induce migration of low energy charged particles;

(e) measuring the current at the collector resulting from impingement of the charged particles; and (f) removing the collector from the position uniformly spaced from the surface.

BRIEF DESCRIPTION OF THE DRAWINGS

FIG. 4 is a cross sectional view of a further embodiment of the present invention.

FIG. 5 is an enlargement of a portion of the protective cap of FIG. 4.

DETAILED DESCRIPTION PREFERRED EMBODIMENT

The present invention relates to a monitor for measuring the radioactivity of a surface, and relies in part on the principle of charge build up in the space between the collector of the monitor and the contaminated surface, as a result of the outward particle flux from the surface. As the decay particles from the radioisotope or radioisotopes contaminating the surface traverse the distance between the contaminated surface and the collector of the monitor, the decay particles lose their energy, and electron-ion pairs are produced in the air or gas space between the contaminated surface and the monitor. The electron-ion pairs move towards the respective anode-cathode electrodes under the influence of an applied electric field. The current generated by the impingement of the particles on the collector of the monitor can be easily measured, and is directly related to the concentration of the radioisotope on the surface, as will be discussed below. As will be appreciated, the particle flux will be comprised of electrons, and positively and negatively charged ions. Should the monitor be used in a vacuum environment, the particle flux will consist of electrons.

Figure 1:
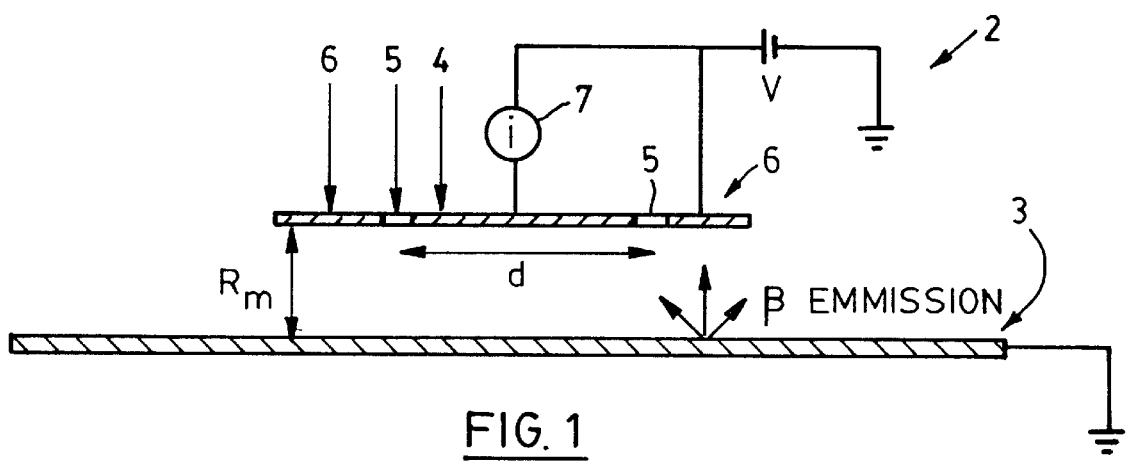
FIG. 1 is a cross sectional view of a simplified embodiment of the present invention.

FIG. 1 is a schematic diagram of a monitor 2 according to the present invention for detecting and measuring the radioactivity of a contaminated surface 3. The monitor 2 comprises a central electron collector 4, which in this embodiment is disc shaped. The collector 4 is surrounded by an annular insulator 5, which serves to insulate the collector 4 from the rest of the monitor. The insulator 5 is in turn surrounded by an annular disc 6. The annular disc 6 is biased to the same potential V as the surface 3 electron collector 4, thereby ensuring a uniform, parallel-plate like electric field beyond the collector region, thus minimizing any loss in collector current signal due to edge effects. The collector current is measured with an electrometer 7, preferably a digital electrometer capable of measuring currents on the order of femtoamperes ($10^{-15}$ A). One such electrometer is the Keithley Electrometer model 617.

The collector current i is, on the average, directly proportional to the energy and intensity of the beta radiation in the space between the collector and the contaminated surface. This current is in turn directly proportional to the concentration of radioisotopes on the contaminated surface immediately below the collector, assuming that the radioisotope surface concentration $n_s$ is uniform over the diameter of the monitor. Assuming that diffusion and ion pair recombination losses are negligible, the collector current will equal the saturation current $i_s$ which can be expressed as follows:

$$i_s = \frac{A_s \lambda E_m}{2W} n_s$$

where $A_s$ is the measurement surface area subtended by the collector, $E_m$ is the mean energy of the decay particles, $\lambda$ is the radioisotope decay constant, W is the mean energy expended by the emitted radiation to form an ion pair, and the factor of ½ accounts for the fact that, on average, half of the decay particles will propagate into the space between the collector and the surface and half will move into the contaminated surface.

Figure 2:
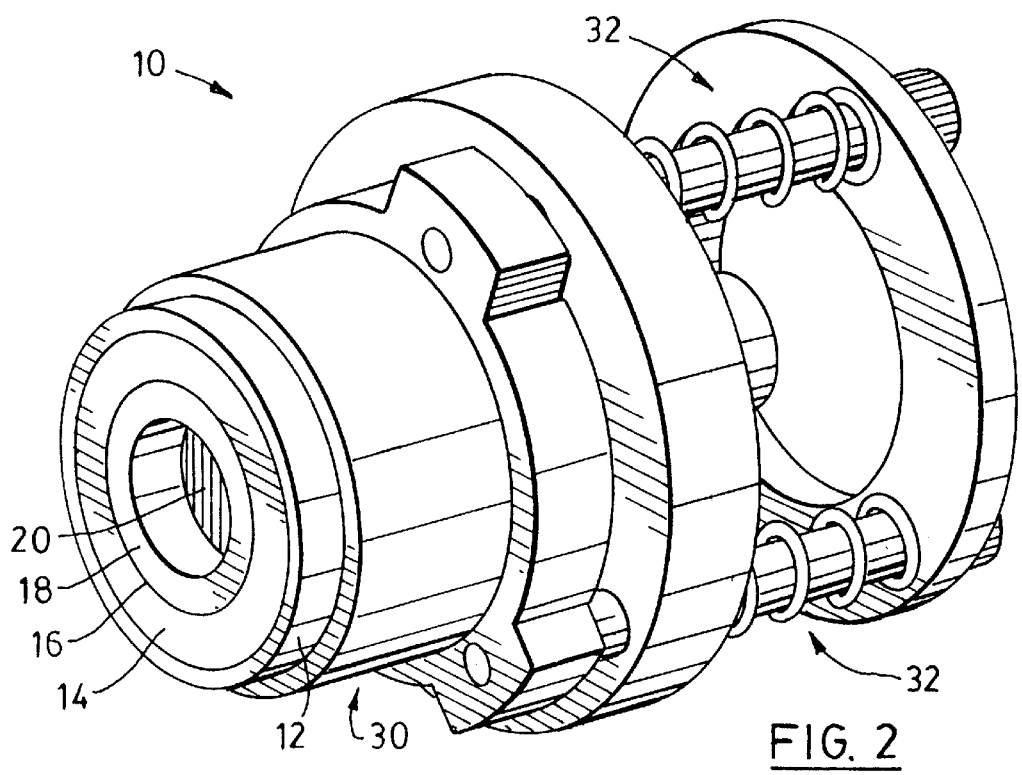
FIG. 2 is a perspective view of a further embodiment of the present invention.

FIG. 2 shows a perspective view of a further embodiment of the present invention, in which a monitor 10 comprises a concentric arrangement of an outer casing 12, an outer insulator 14, an inner shield 16, an inner insulator 18, and an electron collector 20. The electron collector 20 may be disc shaped and preferably is made of stainless steel. Both the outer insulator 14 and the inner insulator 18 are preferably made of Teflon™ or a similar material capable of electrically insulating the collector 20 from the casing 12 and the shield 16. The outer casing 12 and the inner shield 16 are preferably made of stainless steel, although aluminum or other materials may also be suitable.

The inner shield 16 is preferably at the same potential as the collector 20, in order to minimize leakage current and fringe or stray field effects.

Figure 3:
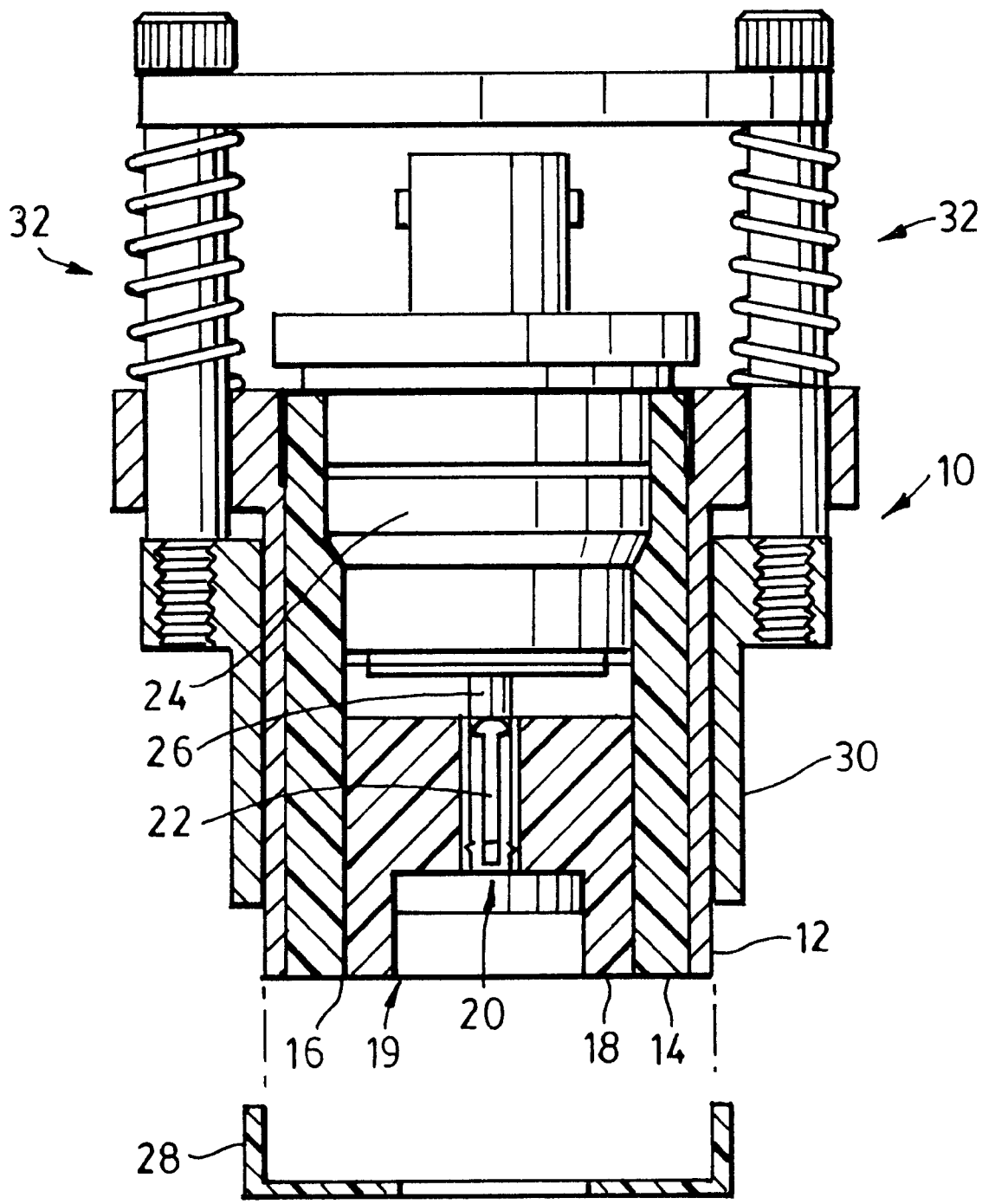
FIG. 3 is a cross sectional view of the embodiment of FIG. 2.

As is best shown in FIG. 3, the inner insulator 18 has a lower insulating surface 19 which is capable of being placed in connection with the contaminated surface, so as to define the area of the contaminated surface subtended by the collector. This subtended area will be of the same size and shape as the area inside the inner insulator, and is the area in which particle emission can be measured. As also shown in FIG. 3, all of the casing 12, outer insulator 14, shield 16 and inner insulator 18 end at a common bottom or contact plane, which abuts or contacts the contaminated surface.

While the embodiment in FIG. 3 shows the collector 20 as being the same size and shape as the subtended area, the collector may be smaller than the subtended area, as, even if the collector is so sized, the collector will collect all the particle flux emanating from the subtended area of the contaminated surface.

The distance between the collector and the contaminated surface (indicated by Rm in FIG. 1) is at least the maximum range of the decay particles of the radioisotope under consideration in the environment in which the monitoring is to occur, and preferably is the maximum range of the decay particles. For example, if the monitor is being used for the detection of tritium and the monitoring is to occur in an air environment, the distance between the lower surface of the collector and the contaminated should be at least about 6 mm, and preferably is about 6 mm.

As shown in FIG. 3, the collector 20 is generally T-shaped, and the stem of the T includes an aperture 22. A floating shield BNC feed through connector assembly 24 having a central pin 26 is used to connect the collector 20 to an electrometer (not shown). The pin 26 of the connector press fits into the aperture 22 of the collector, thereby allowing for current generated by impingement of the electron flux onto the collector 20 to be transmitted to the electrometer, where the current can be displayed in any convenient form.

A protective cap 28, with a central aperture, may be used to prevent cross contamination of the monitor. The cap 28 has a flattened U-shape, and is sized to press fit over the outer casing 12. The monitor includes a slidable casing 30, which is adapted to slide over the outer casing 12 so as to remove the cap 28 from the monitor 10 without handling of the cap. The casing 30 is slidable along three spring bushing assemblies 32, which are arranged such that the casing 32 is in the "up" position when not compressed so as to remove the protective cap.

FIG. 4 shows a cross sectional view of a further embodiment of the present invention, in which a monitor 50 comprises a concentric arrangement of an outer casing 52, an outer insulator 54, an inner shield 56, an inner insulator 58 and an electron collector 60. The materials of construction of the various elements of this embodiment are as for the embodiment of FIG. 2. The outer insulator 54 is generally tubular, and the inner insulator 58 has a generally H-shaped cross section with a central channel. This cross section allows for the lower surface of the collector 60 to be disposed above the lower edge of the monitor 50. The collector 60 is generally T-shaped, and the stem of the T extends through the central channel. In this particular embodiment, the free end of the stem of the T is threaded, so as to allow for the collector 60 to be held in place by a washer 62 and a nut 64.

The end of the stem portion of the collector 60 contains an aperture (not shown) which is adapted to receive an electrical lead 64 of a female triax connector 66. The connector 66 is adapted to receive a male triax connector 68, which transmits the electrical signal from the monitor 50 to a power and display unit (not shown).

As will be understood by those skilled in the art, monitors according to the present invention may be manufactured with an integral power and display unit, to provide a handheld and easily portable unit.

Optionally, the monitor 50 may contain a printed circuit board 70, the circuit board 70 containing circuitry for preamplification of the electrical signal.

To prevent contamination of the monitor when it is placed on a contaminated surface, a removable protective cap 80 may be used. The cap 80 is of a flattened U-shape, and is sized to press fit over the lower portion 82 of the casing 52. The cap 80 contains a central aperture 84, which is in alignment with the collector 60. As shown in FIG. 5, the cap 80 comprises a plastic body 86 to which has been applied a 5in layer 88 of a conductive material, such as aluminum, copper or gold, in order to ensure an electrical connection between the monitor 50 and the contaminated surface. For proper functioning of the monitor, the layer 88 should not extend to the aperture 84, to minimize any interference with the electrical field between the surface and the collector. This structure allows for a protective cap that is inexpensive to produce, yet provides good electrical connection between the contaminated surface and the monitor.

In order to avoid handling of the cap 80 once it has been contaminated, the monitor 50 includes a push rod ejector assembly 90, which comprises a push rod 92, a push button 94, and a spring coil 96. The spring coil 96 is disposed around the push rod 92, such that when the push button is depressed, the end of the push rod 92 extends beyond the lower edge of the monitor 50, thereby dislodging the cap 80 from the lower end 82 of the monitor. With such an assembly, the contaminated cap 80 may be quickly and easily disposed of into a secure disposal container. A fresh uncontaminated cap can then be placed on the monitor ready for measuring another surface and in this way a succession of different surfaces can be checked for radioactivity.

The method of operation of the monitor will now be explained. The monitor is initially zeroed on an uncontaminated surface.

The monitor is then placed into contact with a contaminated surface, such that an electrical connection between the surface and the monitor is achieved, allowing the surface and the monitor to be grounded to the same potential. The collector is then biased to, for example, 100V, and the steady state electron current at the collector is then measured using an electrometer or similar suitable device. Depending on the signal strength, a steady state current is achieved within a few to tens of seconds. The surface contamination may then be calculated using the relationship detailed above.

While the present invention has been described above for measuring the radioactivity of a surface, it is also possible to use the monitor of the present invention to measure the radioactivity of the near surface or sub-surface regions. By assuming that the surface concentration of the radioisotopes is in equilibrium with the sub-surface concentration and that the concentration in the sub-surface region is uniform, the concentration of radioisotopes can be calculated on the basis of the energy flux at the surface. For an energy flux P due to a unit concentration of radioisotopes in the sub-surface with a measured saturation current is the concentration per unit volume $n_T$ can be calculated from the following equation:

$$i_s = n_T \frac{PA_s}{W}$$

With the monitor of the present invention, it is possible to use relatively low applied voltages, on the order of 100 V or less, as the present invention does not rely on charge multiplication as occurs in proportional or Geiger-Muller counters. This results in a monitor in which less shielding is required, and which is safe and easy to operate.

While the embodiments of the present invention described above are useful with planar geometries, the present invention can be adapted to measure the contamination of curved or irregular surfaces. This can be done by, for example, using a flexible elastomeric collector which is coated with a thin metal film.

We claim:

1. A monitor for measuring the radioactivity of a contaminated surface, which is integral and capable of being smeared, from which surface a flux of decay particles is emitted and which surface is separate from and does not form part of the monitor, to enable the monitor to be applied to a succession of different surfaces, the monitor comprising:

(a) an outer casing adapted to form a ground connection with the contaminated surface and extending to a contact plane where the outer casing contacts the contaminated surface;

(b) a collector disposed within the casing and spaced approximately 6 millimeters from the contact plane, so as in use to be spaced from the contaminated surface;

(c) generating means for generating a potential difference between the surface and the collector, the potential being of sufficient intensity to induce particle migration;

(d) connection means for forming a ground connection to the surface;

(e) a circuit connecting the generating means to the connection means and the collector; and (f) means, provided in the circuit, for measuring the current resulting from impingement of charged particles on the collector.

2. A monitor as claimed in claim 1 wherein the collector is adapted to collect electrons.

3. A monitor for measuring the radioactivity of a contaminated surface, which is integral and capable of being smeared, from which surface a flux of decay particles is emitted and which surface is separate from and does not form part of the monitor, to enable the monitor to be applied to a succession of different surfaces, the monitor comprising:

(a) a collector adapted to be spaced from the surface;

(b) generating means for generating a potential difference between the surface and the collector, the potential being of sufficient intensity to induce particle migration;

(c) connection means for forming a ground connection to the surface;

(d) a circuit connecting the generating means to the connection means and the collector;

(e) means, provided in the circuit, for measuring the current resulting from impingement of charged particles on the collector; and (f) an insulator adapted to electrically insulate the collector from the remainder of the monitor, the insulator, in use, bounding a defined area of the surface, wherein the insulator extends to a contact plane where the insulator contacts the contaminated surface and wherein the collector is spaced approximately 6 millimeters from the contact plane, so as in use to be spaced from the contaminated surface.

4. A monitor as claimed in claim 3 wherein the insulator has a lower edge in said contact plane adapted to be placed in connection with the contaminated surface and the collector is spaced from the lower edge of the insulator.

5. A monitor for measuring the contamination of a surface with a radioactive material, which surface is integral and capable of being smeared and, which surface does not form part of the monitor, the monitor comprising:

(a) an outer casing adapted to form a ground connection with the surface and extending to a contact plane for contacting a contaminated surface;

(b) a collector disposed within the casing and spaced approximately 6 millimeters from the contact plane, the collector being adapted to collect at least a portion of a particle flux moving away from the surface;

(c) insulation disposed between the collector and the outer casing to electrically insulate the collector from the outer casing;

(d) generating means for generating a potential difference between the surface and the collector sufficient to induce particle migration;

(e) connection means for forming a ground connection to the surface;

(f) a circuit connecting the generating means to the connection means and the collector; and (g) means, provided in the circuit, for measuring the current generated by impingement of charged particles on the collector.

6. A monitor as claimed in claim 5 further comprising an inner shield disposed between the collector and the insulation, the inner shield adapted to shield the collector from stray electrical fields, the monitor including further insulation disposed between the shield and the collector.

7. A monitor as claimed in claim 6, wherein the collector is generally planar and the monitor is configured so that, when placed on a planar surface, the collector is parallel to the planar surface.

8. A monitor as claimed in claim 5, further comprising a removable cap, the cap being adapted to engage with the outer casing, the cap having an aperture capable of being placed into substantial alignment with the collector, whereby a clean uncontaminated cap can be provided for each surface whose radioactivity is to be measured.

9. A monitor as claimed in claim 8 wherein said cap is coated to provide an electrical connection between the surface and the outer casing.

10. A monitor for measuring the contamination of a surface with a radioactive material which surface is separate from and does not form part of the monitor, to enable the monitor to be applied to a succession of different surfaces, the monitor comprising:

(a) an outer casing adapted to form a ground connection with the surface;

(b) a collector disposed within the casing, the collector adapted to collect at least a portion of a particle flux moving away from the surface, (c) insulation disposed between the collector and the outer casing to electrically insulate the collector from the outer casing, the insulation being shaped to abut the contaminated surface, so as to define an area for particle collection;

(d) generating means for generating a potential difference between the surface and the collector sufficient to induce particle migration;

(e) connection means for forming a ground connection to the surface;

(f) a circuit connecting the generating means to the connection means and the collector; and (g) means, provided in the circuit, for measuring the current generated by impingement of charged particles on the collector.

11. A monitor for measuring the contamination of a surface with tritium, the surface being integral and capable of being smeared, the surface not forming part of the monitor and the surface emitting a flux of decay electrons creating pairs of oppositely charged particles in a molecular gas adjacent the surface, the monitor comprising:

(a) an outer casing adapted to form a ground connection with the contaminated surface and extending to a contact plane where the outer casing contacts the contaminated surface;

(b) a collector adapted to collect at least a portion of said oppositely charged particles of one sign, the collector being disposed within the outer casing and spaced approximately 6 millimeters from the contact plane, so as, in use, to be spaced from the surface with the molecular gas therebetween;

(c) generating means for generating a potential difference between the surface and the collector sufficient to induce charged particle migration;

(d) connection means for forming a ground connection to the surface;

(e) a circuit connecting the generating means to the connection means and the collector; and (f) means, provided in the circuit, for measuring the current generated by impingement of charged particles on the collector.

12. A method of measuring the radioactivity of a contaminated surface which is integral and capable of being smeared and from which a flux of beta decay particles is emitted, the method comprising:

(a) bringing a collector to a position uniformly spaced from the surface;

(b) providing a molecular gas between the collector and the surface, in which molecular gas charged particles are created by passage of beta decay particles from the surface;

(c) providing a ground connection to the surface;

(d) generating a potential difference between the surface and the collector, the potential being such as to create a potential gradient sufficient to induce migration of low energy charged particles;

(e) measuring the current at the collector resulting from impingement of the charged particles; and (f) removing the collector from the position uniformly spaced from the surface.

13. A method as claimed in claim 12, which includes providing a shield around the collector and connecting the collector to an electrometer by a triaxial connection including a connection to the collector, an inner shield connection connected to the shield around the connector and maintained at the same potential as the collector and an outer ground connection connected to the surface.

14. A method as claimed in claim 13, wherein the surface is planar and the collector is parallel thereto.

15. A method as claimed in claim 14, wherein the collector is spaced from the surface by at least the maximum decay range of decay particles emitted from the surface.

16. A method as claimed in claim 14, wherein the collector is spaced from the surface by the maximum range of the decay particles.

17. A method as claimed in claim 14, wherein a ground connection to the surface is provided by way of a protective cap, wherein a new protective cap is used for each surface to prevent contamination.

18. A method as claimed in claim 12, wherein steps (a) to (e) are carried out for a succession of surfaces.

19. A method as claimed in claim 12, which includes the following additional step:

(g) calculating a radioisotope surface concentration $n_s$ from the following equation:

$$i = \frac{A_s \lambda E_m}{2W} n_s,$$

where i is the collector current, $A_s$ is the measurement surface area subtended by the collector, $E_m$ is the mean energy of different decay particles, $\lambda$ is the radioisotope decay constant, W is the mean energy expended by the emitted radiation to form an ion pair.

20. A method as claimed in claim 12, wherein the collector is positively biased with respect to the surface, whereby beta particles are attracted towards the collector.

* * * * *